United States Patent [19]
Mine et al.

[11] Patent Number: 5,225,945
[45] Date of Patent: Jul. 6, 1993

[54] APPARATUS FOR EDITING PCM SIGNALS REPRODUCED AT DIFFERENT SPEEDS FROM TWO MEMORIES

[75] Inventors: Norichika Mine, Kanagawa; Tetsuya Hirano, Tokyo, both of Japan

[73] Assignee: Sony Corporation, Tokyo, Japan

[21] Appl. No.: 313,174

[22] Filed: Feb. 21, 1989

[30] Foreign Application Priority Data

Feb. 24, 1988 [JP] Japan .................................. 63-41011
Feb. 29, 1988 [JP] Japan .................................. 63-46953

[51] Int. Cl.⁵ ........................ G11B 27/02; H04N 9/79
[52] U.S. Cl. ...................................... 360/13; 358/311
[58] Field of Search ................... 360/14.3, 14.2, 14.1, 360/13, 10.1, 32; 358/311

[56] References Cited

U.S. PATENT DOCUMENTS

| | | | |
|---|---|---|---|
| 4,080,867 | 3/1978 | Ratanangsu | 84/478 |
| 4,206,476 | 6/1980 | Hashimoto | 360/32 |
| 4,327,382 | 4/1982 | Tanaka | 360/13 |
| 4,351,007 | 9/1982 | Youngquist | 360/13 |
| 4,363,049 | 12/1982 | Ohtsuki et al. | 360/13 |
| 4,591,926 | 5/1986 | Gaskell et al. | 360/13 |
| 4,791,496 | 12/1988 | Kageyama et al. | 360/10.1 |
| 4,819,087 | 4/1989 | Takeuchi et al. | 360/14.3 |

FOREIGN PATENT DOCUMENTS 55-163672 2/1980 Japan .
57-176577 4/1982 Japan .

Primary Examiner—Aristotelis Psitos
Assistant Examiner—Won Tae C. Kim
Attorney, Agent, or Firm—Hill, Steadman & Simpson

[57] ABSTRACT

A PCM signal editing apparatus with functions of storing in memories the edit-point proximate sample data of a first PCM audio signal reproduced from a first recording medium and that of a second PCM audio signal reproduced from a second recording medium, then reading out such sample data of the PCM audio signals at a desired speed from the memories respectively in a manner to attain a coincidence of the edit points, and cross-fading the signals at the edit-in point or edit-out point in a cross-fade time conforming with the read-out speed, thereby performing a short-time insert editing operation with high efficiency and sufficient certainty. Furthermore, the apparatus is so contrived that the editing conditions proximate to the edit points of the PCM audio signals can be aurally perceived with accuracy, and the access states of the memories are displayed by bar graphs to consequently render the editing state visually recognizable.

1 Claim, 4 Drawing Sheets

APPARATUS FOR EDITING PCM SIGNALS REPRODUCED AT DIFFERENT SPEEDS FROM TWO MEMORIES

BACKGROUND OF THE INVENTION

1. Field of the Invention

The present invention relates to an apparatus for editing PCM signals and, more particularly, to an apparatus having an electronic editing function to edit PCM signals with means of storing the edit-point proximate signals in memories.

2. Description of the Prior Art

In the conventional electronic PCM audio signal editing apparatus designed for additionally inserting a new PCM audio signal in another PCM audio signal obtained through pulse code modulation of an audio signal and recorded on a magnetic tape or for recording such a new PCM audio signal successively to the PCM audio signal already recorded, there are known some examples as disclosed in Japanese Patent Laid-open Nos. 55 (1980)-163672 and 57 (1982)-176577 and so forth. According to such electronic editing apparatus, the operation is performed by previously writing the edit-point proximate sample data of the PCM audio signals in a memory and then reading out the sample data of the PCM audio signals from the memory in accordance with the input data indicative of the edit point. Besides the above, as disclosed in Japanese Patent Laid-open Nos. 54 (1979)-58013 and 55 (1980)-105871, the sample data of the PCM audio signals to be edited are cross-faded at the edit point so as to obtain satisfactory reproduced sounds which are aurally continuous with smoothness.

In the above editing apparatus, an editing start point and an editing end point are determined individually in an insert editing mode by a memory rehearsal which confirms the editing state by reading out the stored sample data from the memories and monitoring the analog reproduced sound, and thereafter both the apparatus for reproducing the new PCM audio signal and the apparatus for reproducing the previously recorded PCM audio signal are driven synchronously with each other in a playback mode to actually run the tapes, and a preview is executed to monitor the reproduced sound for a relatively long time. Therefore the editing efficiency is rendered extremely low and the tapes need to be repeatedly driven to eventually bring about a problem of additional burdens on the mechanisms. In the practical editing operation, modifications with insert editing are frequently adopted posterior to an assemble editing mode, and in the actual insert editing, there are many cases of replacing musical notes or the like of several or less seconds, so that it becomes necessary to enhance the short-time insert editing efficiency.

In the electronic editing apparatus mentioned, the procedure of setting the edit point can be executed accurately by a memory rehearsal with relative simplicity, but in editing the signals with regard to fast-touch piano music or the like, it is still extremely difficult to achieve exact determination of the edit point even with such memory rehearsal. And there exists another problem that a proper grasp is impossible with regard to the cross-fade conditions of PCM audio signals at the edit point.

It is customary, in the above electronic editing apparatus, that display means is provided for displaying the operational states of the reproducing-side tape recorder and the recording-side tape recorder by the use of symbols and messages as well as for numerically displaying the present tape running position in each tape recorder, the editing start point and the editing end point with respect to the time code recorded on the tape. And in accordance with such visual representation on the display means, the editor is enabled to advance the editing procedure while confirming the operational state of each tape recorder, the present tape position and so forth therein.

Furthermore, even with the numerical display, it is impossible to exactly grasp that the sound being monitored corresponds to which of the data stored in the memories, hence raising a problem that the editing operation cannot be performed accurately with high efficiency and sufficient certainty.

OBJECTS AND SUMMARY OF THE INVENTION

It is therefore an object of the present invention to provide a novel PCM signal editing apparatus capable of solving the above-described problems observed in the prior art. In particular, a principal object of the present invention resides in providing a PCM signal editing apparatus which ensures high efficiency and sufficient certainty in performing an editing operation.

Another object of the invention is to provide a PCM signal editing apparatus adapted to execute short-time insert editing of several or less seconds efficiently and certainly.

A further object of the invention resides in providing a PCM signal editing apparatus so contrived as to perform an efficient and certain editing operation with regard to, for example, fast-touch piano music or the like.

A more specific object of the invention is to provide a PCM signal editing apparatus which is capable of reading out the sample data of edit-point proximate PCM signals from memories at a desired speed, then cross-fading the sample data in a time conforming with such read-out speed, and executing a memory rehearsal at a selected speed.

And still a further object of the invention is to provide a PCM signal editing apparatus which enables the editor to know accurately and simply that the sound being monitored corresponds to which of the data stored in the memories.

According to one aspect of the present invention, there is provided a PCM signal editing apparatus comprising first input circuit means for receiving a first PCM signal from a reproducing apparatus; second input circuit means for receiving a second PCM signal from a reproducing and recording apparatus; first memory means for storing the first PCM signal; second memory means for storing the second PCM signal; editing circuit means for connecting the first and second PCM signals mutually and outputting an edited PCM signal; and edit control means for reading out the first and second PCM signals from the first and second memory means respectively and controlling the editing circuit means.

BRIEF DESCRIPTION OF THE DRAWINGS

FIGS. 4A and 4B are schematic diagrams respectively showing how PCM audio signals obtained in a normal read mode and a slow read mode are connected to each other in an assemble editing mode and a rehearsal thereof;

DETAILED DESCRIPTION OF THE PREFERRED EMBODIMENTS

Hereinafter a preferred embodiment of the PCM signal editing apparatus according to the present invention will be described in detail with reference to the accompanying drawings.

Figure 1:
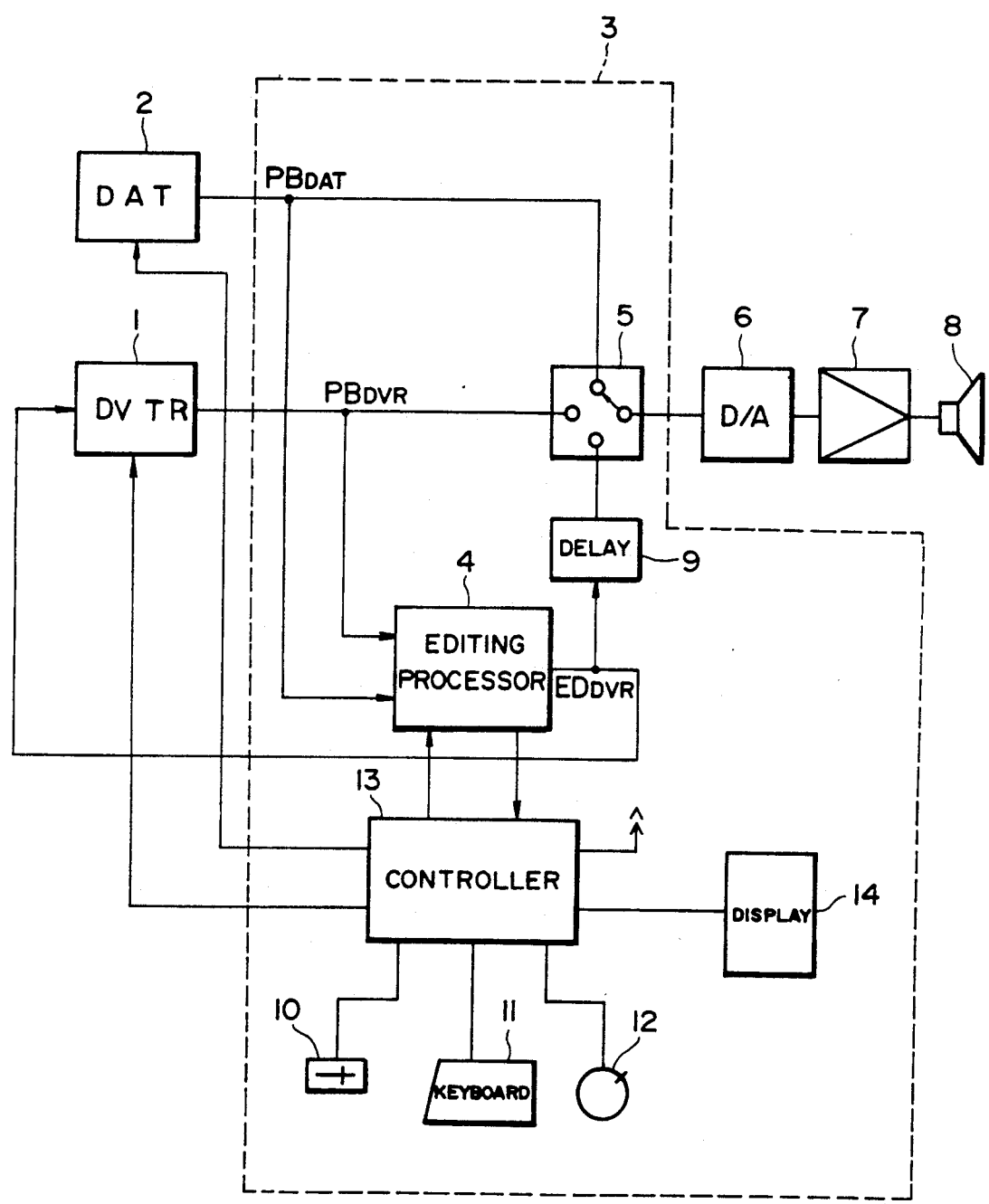
FIG. 1 is a block diagram of an exemplary embodiment of the PCM signal editing apparatus according to the present invention.

In this example, as shown in the block diagram of FIG. 1, a PCM signal editing apparatus 3 is connected to both a helical scanning type digital video tape recorder (DVTR) 1 used as a recording apparatus and a fixed head type digital audio tape recorder (DAT) 2 used as a reproducing apparatus. Each of such DVTR 1 and DAT 2 includes, although not shown, an encoder and a decoder therein, and PCM audio signals at the input and output terminals of the DVTR 1 and DAT 2 are shaped to have the same format.

The editing apparatus 3 is fed with both a reproduced PCM audio signal $PB_{DVR}$ obtained at the playback output terminal of the DVTR 1 and a reproduced PCM audio Signal $PB_{DAT}$ obtained at the playback output terminal of the DAT 2.

The editing apparatus 3 is equipped with an editing processor 4, and an edited PCM audio signal $ED_{DVTR}$ outputted from the editing processor 4 is supplied to the recording input terminal of the DVTR 1. The editing apparatus 3 has a selector switch 5 for selectively outputting either the reproduced PCM audio signal $PB_{DVTR}$ obtained from DVTR 1, the reproduced PCM audio signal $PB_{DAT}$ obtained from the DAT 2 or the edited PCM audio signal $ED_{DVTR}$ from the editing processor 4, and an audio signal produced by converting each of the PCM audio signals $PB_{DVTR}$, $PB_{DAT}$ and $ED_{DVTR}$ into an analog form through a digital-to-analog (D/A) converter 6 is supplied via an audio amplifier 7 to a monitor speaker 8. The edited PCM audio signal $ED_{DVTR}$ outputted from the editing processor 4 is supplied to the switch 5 via a delay circuit 9 which has a delay time equal to the sum of the respective data processing times of the decoder 3 in the DAT 2 and the encoder 5 in the DVTR 1.

The editing apparatus 3 is further equipped with manual input means such as a fader 10, a keyboard 11 and a jog dial 12; a controller 13 to receive input data therefrom; and a display unit 14 driven under control of such controller 13. The controller 13 executes remote control of the DVTR 1 and the DAT 2, operation control of the editing processor 4 and the selector switch 5, and display control of the display unit 14.

Figure 2:
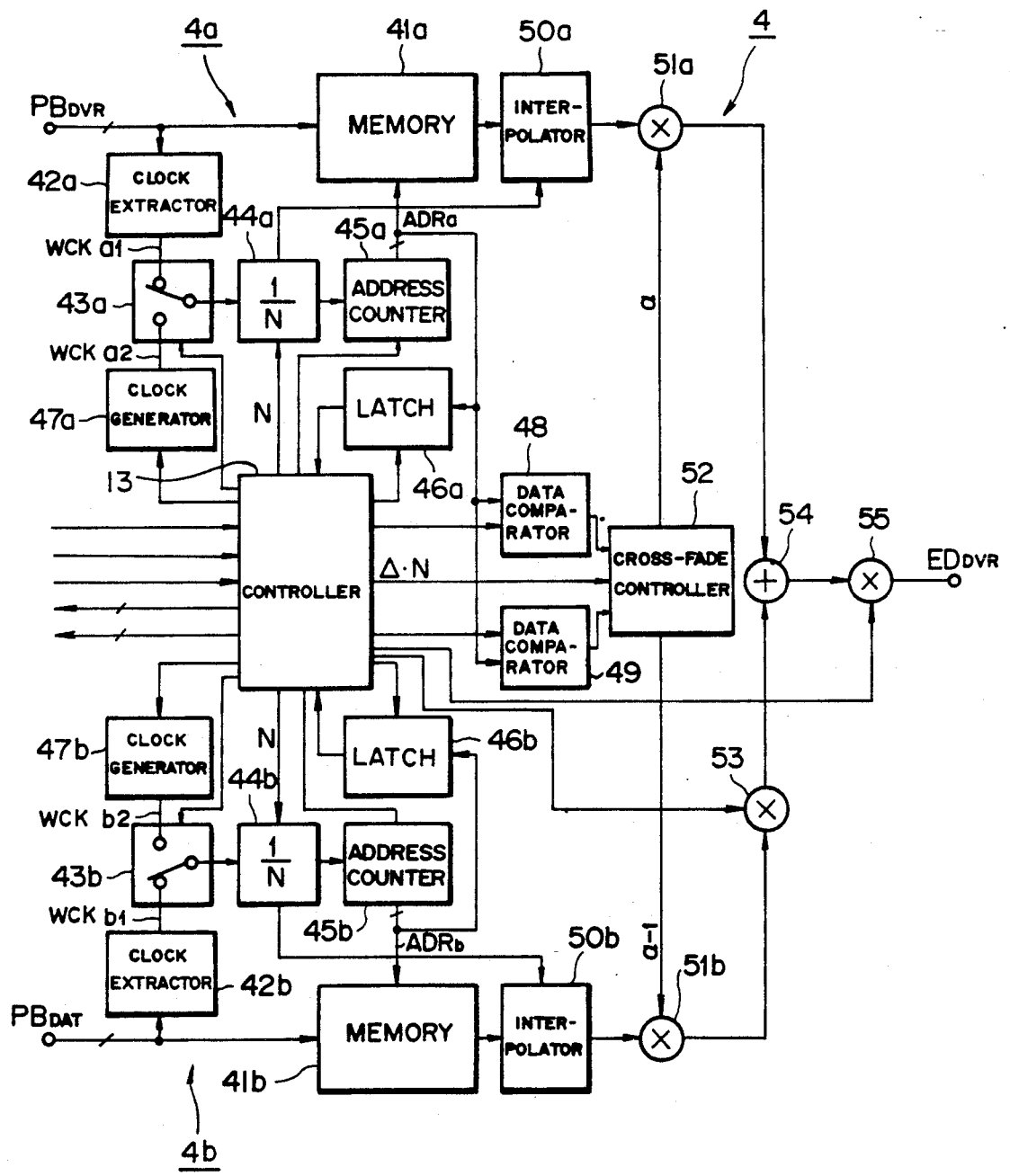
FIG. 2 is a block diagram of an editing processor employed in the editing apparatus shown in FIG. 1.

The editing processor 4 is so constituted as shown in the block diagram of FIG. 2, wherein the reproduced PCM audio Signal $PB_{DVTR}$ obtained from the playback output terminal of the DVTR 1 is supplied to both a first memory 41a and a clock extracting circuit 42a in a recording-side processing circuit 4a.

The clock extracting circuit 42a is a circuit for extracting word clock pulses $wck_{a1}$ from the reproduced PCM audio signal; $PB_{DVR}$, and such word clock pulses $wck_{a1}$ are supplied from a changeover switch 43a via a programmable frequency divider 44a to an address counter 45a. The address counter 45a serves to count the clock pulses supplied from the frequency divider 44a and thereby forms address data $ADR_a$ for the first memory 41a. The address data $ADR_a$ is supplied to the first memory 41a while being supplied also to a latch circuit 46a.

The recording-side processing circuit 4a includes a clock generator 47a driven under control of the controller 13, and the word clock pulses $wck_{a2}$ obtained from the clock generator 47a are supplied from the changeover switch 43a via the programmable frequency divider 44a to the address counter 45a.

All of the changeover switch 43a, the programmable frequency divider 44a and the address counter 45a are driven under control of the controller 13. In a write mode where the sample data proximate to the edit point of the reproduced PCM audio signal $PB_{DVTR}$ outputted from the DVR 1 is written in the first memory 41a, the clock extracting circuit 42a is connected by the changeover switch 43a to the programmable frequency divider 44a whose division ratio is set to 1, and the sample data of the reproduced PCM audio signal $PB_{DVTR}$ is sequentially written in the first memory 41a in accordance with the address data $ADR_a$ formed by the address counter 45a on the basis of the word clock pulses $wck_{a1}$ extracted by the clock sampler 42a. In response to the input data indicative of the edit point $P_1$ and received from the keyboard 11 in the write mode, the controller 13 loads the address data $ADR_1$ at such timing through the latch circuit 46a. And the data writing operation with regard to the first memory 41a is completed at the instant the address data $ADR_a$ formed by the address counter 45a has advanced from the address data $ADR_1$ by an amount equivalent to half the storage capacity of the first memory 41a.

In the reproducing-side processing circuit 4b of the editing processor 4, the reproduced PCM audio signal $PB_{DAT}$ obtained from the playback output terminal of the DAT 2 is supplied to both a second memory 41b and a clock extracting circuit 42b.

The clock extracting circuit 42b is a circuit to produce word clock pulses $wck_{b1}$ from the reproduced PCM audio signal $PB_{DAT}$, and such word clock pulses $wck_{b1}$ are supplied from a changeover switch 43b via a programmable frequency divider 44b to an address counter 45b. The address counter 45b serves to count the clock pulses supplied from the programmable frequency divider 44b and thereby forms address data $ADR_b$ for the second memory 41b. The address data $ADR_b$ is supplied to the second memory 41b while being supplied also to a latch circuit 46b.

The reproducing-side processing circuit 4b includes a clock generator 49b driven under control of the controller 13, and the clock pulses obtained from the clock generator 49b are supplied from the changeover switch 43b via the programmable frequency divider 44b to the address counter 45b.

All of the changeover switch 43b, the programmable frequency divider 44b and the address counter 45b are driven under control of the controller 13. And in the write mode where the sample data proximate to the edit point of the reproduced PCM audio signal $PB_{DAT}$ outputted from the DAT 2 is written in the second memory 41b, the clock extracting circuit 42b is connected by the selector switch 43b to the programmable frequency divider 44b whose division ratio is set to 1, and the sample data of the reproduced PCM audio signal $PB_{DAT}$ is sequentially written in the second memory 41b in accordance with the address data $ADR_b$ formed by the address counter 45b on the basis of the word clock pulses $wck_{b1}$ extracted by the clock extracting circuit 42b. In response to the input data indicative of the edit point $P_2$ and received from the keyboard 11 in the write mode, the controller 13 loads the address data $ADR_2$ at such timing through the latch circuit 46b. And the data writing operation with regard to the second memory 41b is completed at the moment the address data $ADR_b$ formed by the address counter 45b has advanced from the address data $ADR_2$ by an amount equivalent to half the storage capacity of the second memory 41b.

In an assemble editing mode where only a single edit point is existent, the controller 13 loads merely the address data $ADR_{IN1}$ and $ADR_{IN2}$ indicative of the editing start points or edit-in points $P_{IN1}$ and $P_{IN2}$ of the sample data in the memories 41a and 41b. Meanwhile, in an insert editing mode where two edit points are existent, the controller 13 first loads, in the aforementioned recording mode, the address data $ADR_{IN1}$ and $ADR_{IN2}$ indicative of the edit-in points $P_{IN1}$ and $P_{IN2}$ within the range of the storage capacities of the memories 41a and 41b. After releasing the recording mode, the controller 13 determines the editing end point or edit-out point $P_{OUT1}$ by the undermentioned method, then loads the address data $ADR_{OUT1}$ indicative of such edit-out point, and automatically calculates the address data $ADR_{OUT2}$, which indicates the edit-out point $P_{OUT2}$ of the sample data in the second memory 41b, in accordance with the address difference between the edit-in point $P_{IN1}$ and the edit-out point $P_{OUT1}$ of the sample data written in the first memory 41a.

Subsequently the controller 13 feeds to the data comparators 48 and 49 the address data $ADR_{IN1}$ indicative of the edit-in point $P_{IN1}$ in the assemble editing mode, or the address data $ADR_{IN1}$ indicative of the edit-in point $P_{IN1}$ and the address data $ADR_{OUT1}$ indicative of the edit-out point $P_{OUT1}$ in the insert editing mode.

In the data comparators 48 and 49, the address data $ADR_a$ formed by the address counter 45a is compared with the address data $ADR_{IN1}$ and $ADR_{OUT1}$ indicative of the edit point fed from the controller 13, whereby edit-point timing signals are formed.

When the read mode is designated to read out the sample data of the reproduced PCM audio signals $PB_{DVTR}$ or $PB_{DAT}$ proximate to the edit points and written in the first memory 41a or the second memory 41b as mentioned above, word clock pulses $wck_{a2}$ or $wck_{b2}$ of a predetermined frequency are outputted from the clock generator 47a or 47b, and the sample data of the reproduced PCM audio signal $PB_{DVTR}$ or $PB_{DAT}$ proximate to the edit points $P_1$ and $P_2$ are read out from the first memory 41a or the second memory 41b in accordance with the address data $ADR_a$ or $ADR_b$ formed by the address counter 45a or 45b on the basis of the word clock pulses $wck_{a2}$ or $wck_{b2}$. The sample data thus read out from the first memory 41a is supplied via an interpolator 50a to a cross-fading multiplier 51a, which then multiplies the input signal by control coefficient data $\alpha$ fed from the cross-fade controller 52 at the timing $t_0$ of the edit point $P_1$ obtained from the comparator 48, whereby the sample data is faded and then is supplied to the data adder 54.

Meanwhile, the sample data read out from the second memory 41b is supplied via an interpolator 50b to a cross-fading multiplier 51b, which then multiplies the input signal by control coefficient data $\alpha-1$ fed from the cross-fade controller 52 at the timing $t_0$ of the edit point $P_2$ obtained from the comparator 48, whereby the sample data is faded and then is supplied to the data adder 54 via the level adjusting multiplier 53.

The added output data obtained from the data adder 54 is fed to a multiplier 55, which fades the initial and terminal portions of the edited output and produces an edited PCM audio signal $ED_{DVTR}$.

The controller 13 presets the address counters 45a and 45b in a manner to attain a timing coincidence with regard to the edit points so that, in a rehearsal mode or an edited output mode, the data of the reproduced PCM signals $PB_{DVTR}$ and $PB_{DAT}$ can be read out successively at the edit points from the memories 41a and 41b where the reproduced PCM audio signals $PB_{DVTR}$ and $PB_{DAT}$ proximate to the edit points are written.

The respective edit points $P_{IN1}$, $P_{IN2}$, $P_{OUT1}$ and $P_{OUT2}$ of the reproduced PCM audio signal $PB_{DVTR}$ and the reproduced PCM audio signal $PB_{DAT}$ are adjustable within the range of the capacities of the memories 41a and 41b even after the sample data proximate to such edit points are loaded in the memories 41a and 41b. Upon release of the write mode, the controller 13 presets the address data $ADR_{IN1}$ or $ADR_{IN2}$ indicative of the edit point $P_{IN1}$ or $P_{IN2}$ in the address counter 45a or 45b, and then controls the switch 43a or 43b in a manner to select the clock generator 49a or 49b, thereby supplying clock pulses, of which number corresponds to the input data obtained by actuating the keyboard 11, the jog dial 12 or the like, from the clock generator 49a or 49b to the address counter 45a or 45b for accepting adjustment of the address data $ADR_{IN1}$ or $ADR_{IN2}$ indicative of the edit point $P_{IN1}$ or $P_{IN2}$.

When the edit point $P_{IN1}$ of the reproduced PCM audio signal $PB_{DVR}$ is adjusted, the control coefficient $\alpha$ fed from the cross-fade controller 52 to the multiplier 51a may be set to 1; and when the edit point $P_{IN2}$ of the reproduced PCM audio signal $PB_{DAT}$ is adjusted, the control coefficient $1-\alpha$ fed to the multiplier 51b may be set to 1. Then it becomes possible to adjust the two edit points independently of each other while monitoring the edited output $ED_{DVTR}$. Similarly the edit-out point $P_{OUT1}$ in the aforementioned insert editing mode can also be determined by the same procedure.

The cross-fade controller 52 is fed with control data $\Delta \cdot N$ from the controller 13 to designate the cross-fade time Tx in conformity with the frequency division ratio 1/N of the programmable frequency dividers 44a and 44b, so that the cross-fade controller 52 is operated by the controller 13 in such a manner as to feed control coefficient data $\alpha$ and $\alpha-1$, each of which is changed with the step $\Delta$, to the cross fading multipliers 51a and 51b per $1/N \cdot f_s$.

Figure 3A:
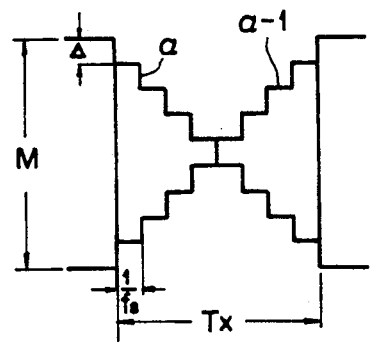
FIG. 3A schematically illustrates the contents of control coefficient data fed in a normal read mode from a cross-fade controller shown in FIG. 2.
Figure 3B:
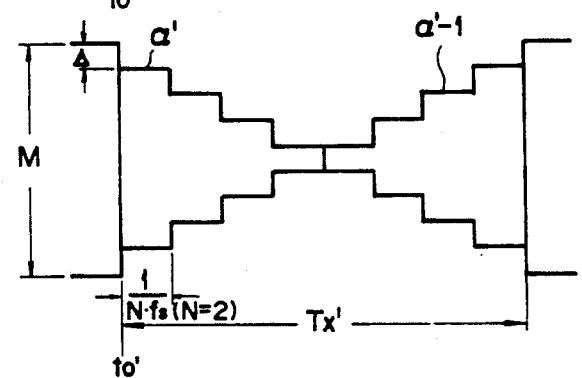
FIG. 3B schematically illustrates the contents of control coefficient data fed in a slow read mode from the cross-fade controller shown in FIG. 2.

In a normal read mode with $N=1$ where the division ratio 1/N of the programmable frequency dividers 44a and 44b is set to 1 and the edit-point proximate sample data of the reproduced PCM signals $PB_{DVR}$ and $PB_{DAT}$ are read out from the memories 41a and 41b respectively at a predetermined sampling frequency $f_s$, the control coefficient data $\alpha$ and $\alpha-1$, each of which is changed during the fade time Tx with the designated step $\Delta$ per word clock pulse $wck_{a2}$ as shown in FIG. 3A, are fed from the cross-fade controller 52 to the cross fading multipliers 51a and 51b, and the cross fade is executed as shown in FIG. 4A. In a slow read mode where the frequency division ratio is set to $N \geqq 2$ and the edit-point proximate sample data of the reproduced PCM signals $PB_{DVTR}$ and $PB_{DAT}$ are read out at a low speed from the memories 41a and 41b respectively in accordance with the word clock pulses of a frequency equal to 1/N of the sampling frequency $f_s$, the control coefficient data $\alpha'$ and $\alpha-1$, each of which is changed during the fade time Tx, (=N·Tx) with the designated step $\Delta$ per clock pulse of a sampling frequency $1/N \cdot f_s$ as shown in FIG. 3B, are fed from the cross-fade controller 52 to the cross fading multipliers 51a and 51b. FIG. 3B graphically represents the control coefficient data $\alpha'$ and $\alpha-1$ in an exemplary case where the frequency division ratio N is set to 2 so that the read speed is reduced to half the speed in the normal read mode.

In the rehearsal mode, the division ratio of the programmable frequency dividers 44a and 44b is set to 1/N, and the edit-point proximate sample data of the reproduced PCM audio signals $PB_{DVR}$ and $PB_{DAT}$ are read out with extension of the time in accordance with the read address data $ADR_a$ and $ADR_b$ formed by the address counters 45a and 45b respectively on the basis of the 1/N output obtained by dividing the word clock pulses $wck_{a2}$ and $wck_{b2}$ of a predetermined sampling frequency $f_s$, so as to execute a memory rehearsal at a desired speed as shown in FIG. 4B. In this case, a cross fading operation is performed with selection of the cross-fade time Tx, conforming with the sample data read speed. Meanwhile in the slow read mode, an operation to form interpolation data corresponding to the predetermined sampling frequency $f_s$ is performed, with regard to the data read out per clock pulse of a frequency $1/N \cdot f_s$, by interpolators 50a and 50b provided between the memories 41a, 41b and the multipliers 51a, 51b.

Due to such memory rehearsal executed at a desired speed to achieve high-precision adjustment of the edit point with the cross fading operation performed by selection of the changeable cross-fade time Tx' conforming with the data read speed, it becomes possible to recognize the cross-fade state of the PCM audio signals at the edit point with aural accuracy, hence determining the edit point precisely even with respect to fast-touch piano music or the like to consequently realize an efficient and certain editing operation.

Figure 4C:
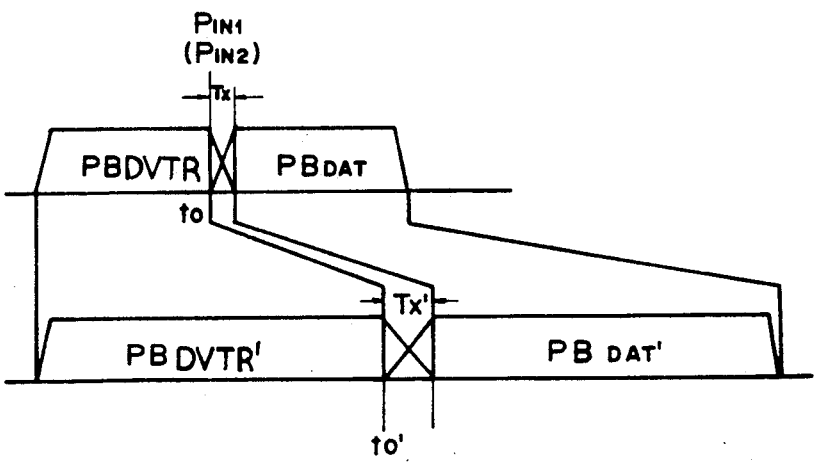
FIG. 4C is a schematic diagram showing how PCM audio signals are connected to each other in an insert editing mode and a rehearsal thereof.
Figure 4C:
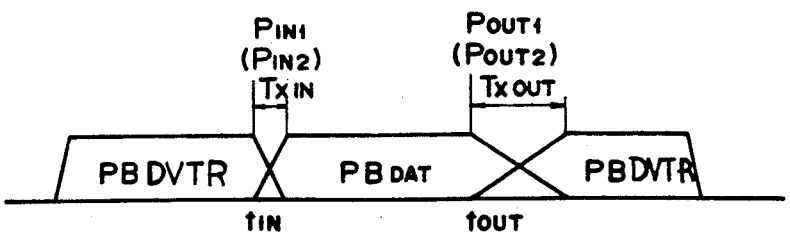

In the insert editing mode, as shown in FIG. 4C, the fade time periods $Tx_{IN}$ and $Tx_{OUT}$ relative respectively to the edit-in points $P_{IN1}$, $P_{IN2}$ and the edit-out points $P_{OUT1}$, $P_{OUT2}$ at the instants $t_{IN}$ and $t_{OUT}$ can be set to desired durations independently of each other with the step data $\Delta$ fed from the controller 13 to the cross-fade controller 52.

In the editing apparatus of this embodiment, the edit-point proximate data of the reproduced PCM audio signals $PB_{DVTR}$ and $PB_{DAT}$ are written in the memories 41a and 41b respectively, and an insert editing operation is performed after establishing the edit-in points $P_{IN1}$, $P_{IN2}$ and the edit-out points $P_{OUT1}$, $P_{OUT2}$ within the range of the storage capacities of the memories 41a and 41b, so that the state from the edit-in point to the edit-out point can be confirmed by the memory rehearsal, and the insert editing is rendered possible up to maximum of one-word data. Consequently, in a practical editing procedure and rehearsal, it becomes possible to attain a remarkably efficient short-time insert editing operation such as replacement of musical notes in fast-touch piano music or the like, without the necessity of synchronously driving the reproducing apparatus and the recording apparatus. And spot erasure for partial muting can also be executed by feeding a fade coefficient 0 to the level adjusting multiplier 53 which receives via the cross fading multiplier 51b the edit-point proximate sample data of the reproduced PCM audio signal $PB_{DAT}$ read out from the second memory 41b.

Figure 5A:
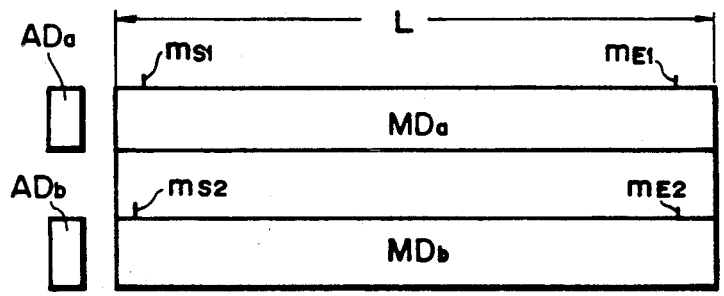
FIG. 5A schematically illustrates the display areas on a display unit in the editing apparatus of FIG. 1.

Furthermore, the display unit 14 in this embodiment has, as illustrated in FIG. 5A, first and second bar-graph display areas $MD_a$ and $MD_b$ of a length L corresponding to the storage capacity of each of the first and second memories 41a and 41b in the editing processor 4, and the following display control is executed by the controller 13 in conformity with the access states of the memories 41a and 41b.

Figure 5B:
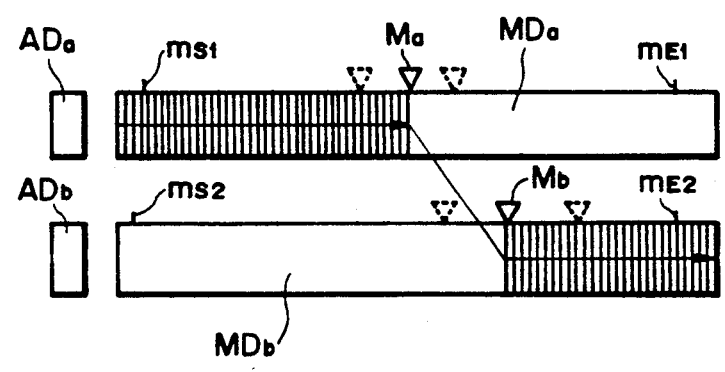
FIGS. 5B and 5C schematically illustrate exemplary display contents of the display unit of FIG. 5A in the assemble editing mode and the insert editing mode.

In the assemble editing mode, for example, first the edit point $P_{IN1}$ is established, and the sample data of the reproduced PCM audio Signal $PB_{DVTR}$ proximate to the point $P_{IN1}$ is written in the first memory 41a. Then, as illustrated in FIG. 5B, a marker $M_a$ shiftable along the display area $MD_a$ is displayed in accordance with the address data $ADR_{IN1}$ indicative of the edit point $P_{IN1}$, and simultaneously an effective data address region and an ineffective data address region are displaced to be visually distinguishable in different states of the first bar-graph display area $MD_a$ with a boundary defined therebetween at the position of the marker $M_a$, i.e. the address data $ADR_{IN1}$ indicative of the edit point $P_{IN1}$. Similarly, after the edit point $P_{IN2}$ is established, the sample data of the reproduced PCM audio signal $PB_{DAT}$ proximate to the point $P_{IN2}$ is written in the second memory 41b. Then a marker $M_b$ is displayed in accordance with the address data $ADR_{IN2}$ indicative of the edit point $P_{IN2}$, and simultaneously an effective data address region and an ineffective data address region are displayed to be visually distinguishable in different states of the second bar-graph display area $MD_b$ with a boundary defined therebetween at the position of the marker $M_b$, i.e. the address data $ADR_{IN2}$ indicative of the edit point $P_{IN2}$. The positions of the markers $M_a$, $M_b$ and the bar-graph states of the display areas $MD_a$, $MD_b$ are shifted by adjustments of the edit points $P_{IN1}$ and $P_{IN2}$ as shown by broken lines in FIG. 5B. In the rehearsal mode or the edited output mode, the access states of the effective data address areas in the memories 41a and 41b are visually represented by bar graphs in such a manner that the dislay states thereof change with the lapse of time, as shown by arrows in FIG. 5B.

In the insert editing mode, first the edit-in point $P_{IN1}$ is established and the sample data of the reproduced PCM audio signal $PB_{DVR}$ proximate to the point $P_{IN1}$ is written in the first memory 41a, and after the edit-out point $P_{OUT1}$ is established, the markers $M_{INa}$ and $M_{OUTa}$ are displayed in accordance with the address data $ADR_{IN1}$ and $ADR_{OUT1}$ indicative respectively of the edit-in point $P_{IN1}$ and the edit-out point $P_{OUT1}$, and simultaneously an effective data address region and an ineffective data address region are displayed to be visually distinguishable in different states of the first bar-graph display area $MD_a$ with a boundary defined therebetween at the positions of the markers $M_{INa}$ and $M_{OUTa}$, i.e. the address data $ADR_{IN1}$ and $ADR_{OUT1}$ indicative respectively of the edit-in point $P_{IN1}$ and the edit-out point $P_{OUT1}$. In a similar manner, the edit-in point $P_{IN2}$ is established, and the sample data of the reproduced PCM audio signal $PB_{DAT}$ proximate to the point $P_{IN2}$ is written in the second memory 41b. After the edit-out point $P_{OUT2}$ is established, the markers $M_{INb}$ and $M_{OUTb}$ are displayed in accordance with the address data $ADR_{IN2}$ and $ADR_{OUT2}$ indicative respectively of the edit-in point $P_{IN2}$ and the edit-out point $P_{OUT2}$, and simultaneously an effective data address region and an ineffective data address region are displayed to be visually distinguishable in different states of the second bar-graph display area $MD_b$ with a boundary defined therebetween at the positions of the markers $M_{INb}$ and $M_{OUTb}$, i.e. the address data $ADR_{IN2}$ and $ADR_{OUT2}$ indicative respectively of the edit-in point $P_{IN2}$ and the edit out point $P_{OUT2}$. The positions of the markers $M_{INa}$, $M_{OUTa}$, $M_{INb}$, $M_{OUTb}$ and the bar-graph states of the display areas $MD_a$ and $MD_b$ are shifted by adjustments of the edit points $P_{IN1}$, $P_{OUT1}$, $P_{IN2}$ and $P_{OUT2}$. And in the rehearsal mode or the edited output mode, the access states Of the effective data address areas in the memories 41a and 41b are visually represented by bar graphs in such a manner that the display states thereof change with the lapse of time, as shown by arrows in FIG. 5C.

Figure 5C:
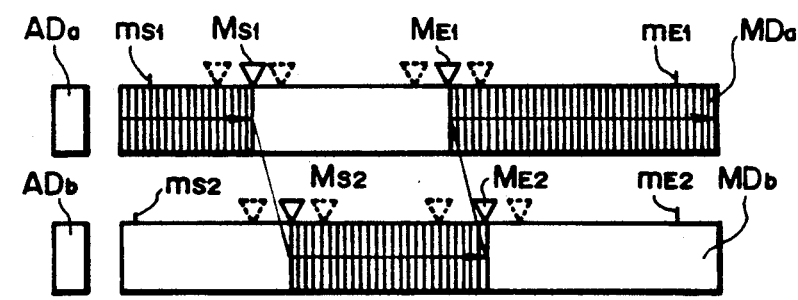

As illustrated in FIGS. 5A through 5C, the display areas $AD_a$ and $AD_b$ on the left side of the bar-graph display areas $MD_a$ and $MD_b$ are so controlled by the aforementioned controller 13 as to blink for visually representing that the running tape positions in the DVTR 1 and the DAT 2 are close to the sample data of the PCM audio signals $PB_{DVTR}$ and $PB_{DAT}$ which are proximate to the edit points and are to be written or already written in the memories 41a and 41b. Meanwhile the markers $m_{Sa}$, $m_{Ea}$, $m_{Sb}$ and $m_{Eb}$ shown in the vicinities of the respective ends of the bar-graph display areas $MD_a$ and $MD_b$ represent the limits in establishing the edit points $P_{IN1}$, $P_{OUT1}$, $P_{IN2}$ and $P_{OUT2}$. And such markers are automatically controlled by the controller 13 in conformity with the types of the recording and reproducing apparatus to feed the PCM audio signals $PB_{DVTR}$, $PB_{DAT}$ therefrom and also with the constant of the cross fader and so forth.

Thus, the display means visually represents, in the form of bar graphs, the access states of the memories where the PCM audio signals proximate to the edit point are written in and read out in accordance with the input data indicative of the edit point, thereby enabling the editor to grasp the present editing operation accurately and simply from the bar-graph display contents to consequently ensure high efficiency and sufficient certainty in proceeding with the operation.

What is claimed is:

1. An apparatus for editing PCM signals, comprising: first input circuit means for receiving a first PCM signal from a reproducing apparatus; second input circuit means for receiving a second PCM signal from a reproducing and recording apparatus; first memory means which receives and stores the first PCM signal; second memory means which receives and stores the second PCM signal; editing circuit means which receives said first and second PCM signals from said first and second memory means and producing an edited PCM signal; edit control means for controlling read-out of the first and second PCM signals from said first and second memory means, respectively, and connected to said editing circuit means to control it, wherein said edit control means includes a register means for storing first edit-in and edit-out points of the first PCM signal and for storing second edit-in and edit-out points of the second PCM signal, respectively, wherein said editing circuit means includes cross-fade circuit means for selectively cross-fading the first and second PCM signals together, wherein said edit control means includes means for reading out the first and second PCM signals from said first and second memory means at different speeds and said cross-fade circuit means connects the first and second pcm signals and performs cross-fade, and further comprising display means for visually displaying the editing operation and the status of said first and second memory means.

* * * * *